US006980682B1

(12) United States Patent
Avinash et al.

(10) Patent No.: US 6,980,682 B1
(45) Date of Patent: Dec. 27, 2005

(54) METHOD AND APPARATUS FOR EXTRACTING A LEFT VENTRICULAR ENDOCARDIUM FROM MR CARDIAC IMAGES

(75) Inventors: Gopal B. Avinash, New Berlin, WI (US); Matthew W. Turek, Glenville, NY (US); William J. Bridge, Watertown, WI (US)

(73) Assignee: GE Medical Systems Group, LLC, Waukesha, WI (US)

( * ) Notice: Subject to any disclaimer, the term of this patent is extended or adjusted under 35 U.S.C. 154(b) by 985 days.

(21) Appl. No.: 09/721,606

(22) Filed: Nov. 22, 2000

(51) Int. Cl.$^7$ ............................................. G06K 9/00
(52) U.S. Cl. ........................................................ 382/131
(58) Field of Search ........................... 382/128, 131, 382/132; 250/584, 370.08, 370.09; 378/4, 21, 23, 24, 25, 62, 63; 600/425, 410, 443, 463

(56) References Cited

U.S. PATENT DOCUMENTS

| | | | | |
|---|---|---|---|---|
| 4,961,425 A | * | 10/1990 | Kennedy et al. | 600/425 |
| 5,239,591 A | * | 8/1993 | Ranganath | 382/128 |
| 5,669,382 A | * | 9/1997 | Curwen et al. | 600/425 |
| 5,782,762 A | * | 7/1998 | Vining | 600/407 |
| 5,825,908 A | * | 10/1998 | Pieper et al. | 382/131 |
| 5,859,891 A | * | 1/1999 | Hibbard | 378/62 |
| 5,970,164 A | * | 10/1999 | Bamberger et al. | 382/128 |
| 6,081,577 A | * | 6/2000 | Webber | 378/23 |
| 6,246,784 B1 | * | 6/2001 | Summers et al. | 382/128 |
| 6,385,332 B1 | * | 5/2002 | Zahalka et al. | 382/128 |
| 6,561,980 B1 | * | 5/2003 | Gheng et al. | 600/443 |

OTHER PUBLICATIONS

Buller, V.G.M., van der Geest, R.J., Kool, M.D. van der Wall, E.E., de Roos, A. & Reiber, J.H.C. (Sep. 1997) Assessment of Regional Left Ventricular Wall Parameters from Short Axis Magnetic Resonance Imaging using a Three Dimensional Extension to the Improved Centerline Method, *Investigative Radiology, 32(9)* 529–539.

Casellas, V., Catte, F., Cool, T. & Dibos, F. (1993) A Geometric Model for Active Contours in Image Processing. *Numerische Mathematik., 66*, 1–31.

Chen, J.T.T. (1997) *Essentials of Cardiac Imaging*. (Second Edition). Philadelphia, PA: Lippencott—Raven Publishers, pp. 47–68.

Gardner, J.C. Heyano, S.L., Yaffe, L.G., von Ingersleben, G., & Chestnut, C.H. (1996). A Semi–Automated Computerized System for Fracture Assessment of Spinal X–Ray Films. *Proceedings of The International Society for Optical Engineering 2710*, 996–1008.

Goshtasby, A., & Turner, D.A. (Mar. 1995) Segmentation of Cardiac Cine MR Images for Extraction of Right and Left Ventricular Chambers. *IEEE Transactions on Medical Imaging., 14(1)*, 56–64.

(Continued)

*Primary Examiner*—Andrew W. Johns
*Assistant Examiner*—Shervin Nakhjavan
(74) *Attorney, Agent, or Firm*—Quarles & Brady LLP (57) ABSTRACT

A method and apparatus is provided for segmenting a left ventricular endocardium in a magnetic resonance image. Image shape, size, gradients, intensity, and connectivity are used to locate the endocardial boundary. Specifically, a series of dilations and refinements to a mask corresponding to acquired data is performed. Variations in intensity, representing the endocardial boundary, are detected, and the endocardial boundary may then be clearly identified in the MR image.

19 Claims, 9 Drawing Sheets

OTHER PUBLICATIONS

Kimia, B.B., Tannenbaum, A., & Zucker, S.W. (Jan. 15, 1992) On the Evolution of Curves via a Function of Curvature I. The Classical Case. *Mathematical Analysis and Applications 163(2)*, 438–458.

Malladi, R. Sethian, J., & Vemuri, B. (1995) Shape Modeling with Front Propagation: A Level Set Approach. *IEEE Transactions on Pattern Analysis and Machine Intelligence. 17*, 158–175.

McVeigh, E.R. & Guttman, M.A., (1992) Visualization and Analysis of Functional Cardiac MRI Data, *Proceedings of The International Society for Optical Engineering.* 2168.

O'Dell, W.G., Moore, C.C. Hunter, W.C., Zerhouni, E.A., McVeigh, E.R., (1994) Displacement Field fitting for Calculating 3D Myocardial Deformations from Tagged MR Images. [WWW document] URL http://prospero.bme–mr-i.jhu.edu/papers/wodell94_I/fieldfit_rad.html.

Osher, S.J., & Sethian, J.A. (1988) Fronts Propagation with Curvature Dependent Speed: Algorithms Based on Hamilton–Jacobi Formulations. *Journal of Computational Physics. 79* 12–49.

Ranganath, S. (Jun. 1995) Contour Extraction from Cardiac MRI Studies Using Snakes. *IEEE Transactions on Medical Imaging. 14(2)* 328–338.

Sapiro, G. & Tannenbaum, A. (1993) On Invariant Curve Evolution and Image Analysis, *Indiana University Mathematics Journal; 42(3)*, 985–1009.

Sethian, J.A. (May–Jun. 1997) Tracking Interfaces with Level Sets. *American Scientist., 85*, 254–263.

Van der Geest, R.J., Buller, V.G.M., Jansen, E., Lamb, H.J., Baur, L.H.B., van der Wall, E.E., de Roos, A., & Rieber, J.H.C. (1997) Comparison Between Manual and Semiautomated Analysis of Left Ventricular Volume Parameters from Short Axis MR Images. *Journal of Computer Assisted Tomography., 21(5)*, 756–765.

Van der Geest, R.J., de Roos, A., van der Wall, Ernst E., & Reiber, J.H.C. (1997) Quantitative Analysis of Cardiovascular MR Images., *International Journal of Cardiac Imaging; 13* 247–258.

Yezzi, A., Kichenassamy, S., Kumar, A., Olver, P., & Tannenbaum, A. (Apr. 1997) A Geometric Snake Model for Segmentation of Medical Imagery. *IEEE Transaction on Medical Imaging, 16*, 199–209.

\* cited by examiner

| ITERATION | COUNT | MEAN1 | MEAN2 | MEAN3 | SD |
|---|---|---|---|---|---|
| 2 | 28 | 150.09 | 72.48 | 0 | 0 |
| 3 | 104 | 142.19 | 72.48 | 146.48 | 2.48 |
| 4 | 147 | 134.3 | 72.48 | 137.76 | 2.25 |
| 5 | 181 | 126.4 | 72.48 | 130.44 | 2.26 |
| 6 | 210 | 118.5 | 72.48 | 122.9 | 2.2 |
| 7 | 252 | 110.59 | 72.48 | 114.95 | 3.09 |
| 8 | 287 | 102.69 | 72.48 | 105.7 | 2.6 |
| 9 | 333 | 94.8 | 72.48 | 97.65 | 2.66 |
| 10 | 384 | 86.9 | 72.48 | 89.27 | 2.51 |
| 11 | 439 | 79.0 | 72.48 | 82.05 | 1.86 |
| 12 | 549 | 71.09 | 72.48 | 74.04 | 2.28 |
| 13 | 6956 | 63.19 | 72.48 | 88.41 | 16.88 |

METHOD AND APPARATUS FOR EXTRACTING A LEFT VENTRICULAR ENDOCARDIUM FROM MR CARDIAC IMAGES

BACKGROUND OF THE INVENTION

The present invention relates generally to nuclear magnetic resonance imaging methods and systems, and in particular, relates to segmentation of a human internal organ, or a portion of an internal organ, for example a left ventricular endocardium.

When a substance such as human tissue is subjected to a uniform magnetic field (polarizing field $B_0$), the individual magnetic moments of the spins in the tissue attempt to align with this polarizing field, but precess about it in random order at their characteristic Larmor frequency. If the substance, or tissue, is subjected to a magnetic field (excitation field $B_1$) which is in the x-y plane and which is near the Larmor frequency, the net aligned moment, $M_z$, may be rotated, or "tipped", into the x-y plane to produce a net transverse magnetic moment $M_t$. A signal is emitted by the excited spins after the excitation signal $B_1$ is terminated, this signal may be received and processed to form an image.

When utilizing these signals to produce images, magnetic field gradients ($G_x$, $G_y$ and $G_z$) are employed. Typically, the region to be imaged is scanned by a sequence of measurement cycles in which these gradients vary according to the particular localization method being used. The resulting set of received NMR signals are digitized and processed to reconstruct the image using one of many well-known reconstruction techniques.

Most NMR scans currently used to produce medical images require many minutes to acquire the necessary data. The reduction of this scan time is an important consideration since reduced scan time increases patient throughput, improves patient comfort, and improves image quality by reducing motion artifacts. There is a class of pulse sequences which have a very short repetition time (TR) and result in complete scans which can be conducted in seconds rather than minutes. When applied to cardiac imaging, for example, a complete scan from which a series of images showing the heart at different phases of its cycle can be acquired in a single breath-hold.

The prognosis of patients with a wide variety of cardiac diseases (including coronary artery disease, valvular heart disease, congestive heart failure and cardiac arrhythmias) has been closely linked to the performance of the heart as indicated by measurements such as wall thickening, wall motion, and myocardial mass. Accurate quantitative measures of regional contractile function could therefore have significant prognostic and therapeutic importance. For example, many patients with severe coronary artery disease may have normal regional and global left ventricular function at rest but have abnormalities induced by stress. In clinical practice, patients with coronary artery disease can be detected by stress echocardiography based on new functional deficits during stress. However, interobserver variability of this type of qualitative measure is an inherent limitation that could be improved with quantitative measures. Thus, there is a need for high quality quantitative measures of regional cardiac function.

Segmentation of the left ventricle in MR images is therefore a fundamental step in analyzing the performance of the heart. MR image data of the endocardium is currently acquired by applying a specific sequence of RF pulses to yield a NMR signal that provides information pertaining to the tissue under test. A particular pulse sequence can therefore be applied to obtain an image of pixels in the intensity range of, for example, a cross-section of the left ventricle tissue. Current processes are available for segmenting the epicardium, but they lack robustness and are difficult to use.

Segmentation methods that are currently available include snake-based techniques such as that described by A. Yezzi, et al. "A Geometric Snake Model for Segmentation of Medical Imagery," IEEE Transaction on Medical Imaging, 16, 199–209 (April, 1997). Snakes, also known as active contours, have been used in an attempt to segment features of the left ventricle. Snakes are described by a parameterized curve whose evolution is determined by the minimization of an energy field. The equation of the energy field, as defined by J. C. Gardner et al. "A Semi-Automated Computerized System for Fracture Assessment of Spinal X-Ray Films," Proceedings of the International Society for Optical Engineering, 2710, 996–1008 (1996), is:

$$E[\vec{x}(s)] \equiv k \int_0^1 ds \left[ \frac{1}{2}\alpha \left(\frac{d\vec{x}}{ds}\right)^2 + \frac{1}{2}\beta \left(\frac{d^2\vec{x}}{ds^2}\right)^2 - \gamma H(\vec{x}(s)) \right] \quad (1)$$

where s is the parameterization variable, $\vec{x}$ is the parameterized curve, $\kappa$ is the normalization constant, $\alpha$ is the $H(\vec{x}) = |\vec{\nabla}/(\vec{x})|$ tension of the snake, $\beta$ is the rigidity of the snake, $\gamma$ controls the attraction to image features, and I is the pixel intensity of the image. H(x) refers to a function which defines the features that attract the snake algorithm to the boundary and, typically, is chosen to be the magnitude of the gradient of the image intensity.

Because the magnitude of the gradient is used to attract the algorithm to the boundary of the left ventricle, the snake does not work well where the boundary is defined by edges that are weak in intensity. In order for the snake algorithm to attach to a boundary, a user must intervene and supply a boundary condition to define the proximity of the boundary for the snake. This is undesirable because the user may need to interact with the segmentation algorithm while the images are being processed. Snake based techniques can be used, as described by Yezzi, to produce a geometric snake model having a stopping term and a constant inflation term added to the evolution equation. The resulting evolution equation of the Yezzi active contour model is:

$$\frac{\partial \Psi}{\partial t} = \phi \|\nabla \Psi\|(\kappa + \nu) + \nabla \phi * \nabla \Psi \quad (2)$$

where v is a constant inflation force, $$\kappa \equiv \text{div} \frac{\nabla \psi}{\|\nabla \psi\|}$$

is the curvature of the level sets of $\psi(x, y, t)$, $\phi$ is a function dependent on the type of image and is a stopping term for the curve evolution. Snake based techniques are additionally unfavorable because they rely primarily on edge information only, and therefore are subject to greater error and generally lack robustness, particularly in a clinical setting. S. Ranganath attempted unsuccessfully to segment an endocardium using a snake, as described in "Contour Extraction from Cardiac MRI Studies Using Snakes," IEEE Transactions on Medical Imaging, 14(2), 328–338 (June, 1995).

Another such method currently used in conjunction with attempted detection of endocardial boundaries is a shape-based technique known as the MR Analytical Software System (MASS), introduced by R. J. van der Geest et al. "Comparison Between Manual and Semiautomated Analysis of Left Ventricular Volume Parameters from Short-Axis MR Images," Journal of Computer Assisted Tomogrophy," 21(5), 756–675 (1997), which uses shape as the central principal for the detection of the epicardial and endocardial contours. The MASS algorithm operated by first using a Hough transform, well known in the art, to determine the initial search location for the endocardial and epicardial boundaries. The Hough transform produces a map with high values near the center of approximately circular objects in the original image. A size constraint is then used to narrow a search for circular areas in the image corresponding to the first cardiac phase. After the search determines which circular areas constitute the boundary areas, a line is fit through the Hough images to estimate the center of the left ventricle. The line provides an estimate of the longitudinal axis of the heart.

The MASS algorithm then transforms each image in the study to a polar image and computes a polar edge image. Using a circle estimation from the original image, the intensity of edges in the radial direction, an estimate for myocardial wall thickness, and a maximum likelihood estimate of the endocardial and epicardial radii are calculated. If a satisfactory estimate is not found for the epicardial radius, one is created afterward through linear interpolation between adjacent radii. Once the epicardial boundary has been determined, MASS uses an intensity thresholding technique to find the endocardial boundary. However, because shape-based techniques primarily rely on the shape of the image to produce the outer edge pattern, these methods, like the snake, are subject to error and generally lack robustness.

What is therefore needed is a method and apparatus for segmenting an epicardium in an image that relies on several information sources to produce an image of the left ventricular epicardial boundary that is clinically robust and that operates with greater accuracy than conventional techniques and that requires only minimal user interaction.

SUMMARY OF THE INVENTION

The present invention relates to a system and method for segmenting a human organ, and in particular, a left ventricular endocardium using a method that relies on image shape, size, gradients, intensity, and connectivity, and requires only minimal user input to provide a clinically robust mask image of the endocardium of a human heart.

In accordance with a first aspect of the invention, a method for extracting an image acquired with a medical imaging system to identify the boundary of an organ includes acquiring image data of the organ, and subsequently reconstructing an image corresponding generally to the organ. Next, a starting location is selected on the reconstructed image within the confines of the boundary of the organ. Next, an expansion boundary is iteratively propagated around the starting location outwardly a plurality of times until it is determined that the expansion boundary has traversed the boundary of said organ. Finally, a representation of the boundary of the organ is output to a user.

BRIEF DESCRIPTION OF THE DRAWINGS

Reference is hereby made to the following figures in which like reference numerals correspond to like elements, and in which.

GENERAL DESCRIPTION OF THE INVENTION

An endocardial segmentation process is performed on an acquired MR image by an image processor using image shape, gradients, intensity, and connectivity.

In particular, a seed point in the blood pool mask having a sufficiently high intensity value is selected. It should be appreciated that the term "blood pool" as used in accordance with the preferred embodiment refers to the blood mass inside the left ventricular chamber of the heart. An iterative process ensues that takes advantage of the fact that the pixel intensities will vary in a predictable manner throughout the blood pool. In particular, the intensities are expected to increase significantly at the endocardial boundary.

A binary map is created corresponding to the image having a seed pixel of high intensity selected. Next, the map is dilated such that pixels surrounding the seed pixel are turned "on" whose intensities are greater than a predetermined threshold intensity value. The map is refined, and subsequent dilations and refinements are preformed with the threshold intensity value decreasing with each iteration. Accordingly, the expansion boundary of the mapped image propagates outwardly towards the endocardial boundary.

The mean and standard deviation of the resulting intensity values of the resulting image corresponding to the boundaries are calculated and stored for each iteration. The dilations repeat until the expansion boundary grows beyond the endocardium, and into the other areas surrounding the heart. As the boundary moves beyond the endocardial wall, the boundary should encounter an increase in intensity due to the different tissue compositions of the regions beyond the endocardium. The behavior of the calculated standard deviation will reflect the boundary advancing from the endocardium and into the myocardium. The changes in standard deviation as each iteration is performed therefore provides a relatively accurate approximation of the region containing the endocardial boundary.

Once the statistical computations indicate that the expansion boundary has propagated past the endocardial boundary, final refinements are made to the image to produce an output mask of the blood pool. The outer contour of the blood pool, of course, defines the contour of the endocardial boundary. Once the endocardial boundary is produced, a smoothing process may performed to create a smooth curve representing the endocardial boundary of the left ventricle, if so desired. Additionally, the image corresponding to the endocardial boundary may be produced for observation by the user.

Furthermore, the method in accordance with the preferred embodiment produces an error message if the statistics do not show the expansion boundary crossing the endocardial boundary after a predetermined number of iterations, or if the size of the expansion boundary becomes too large, indicating that it has likely traversed the endocardial boundary.

DETAILED DESCRIPTION OF THE PREFERRED EMBODIMENT

Figure 1:
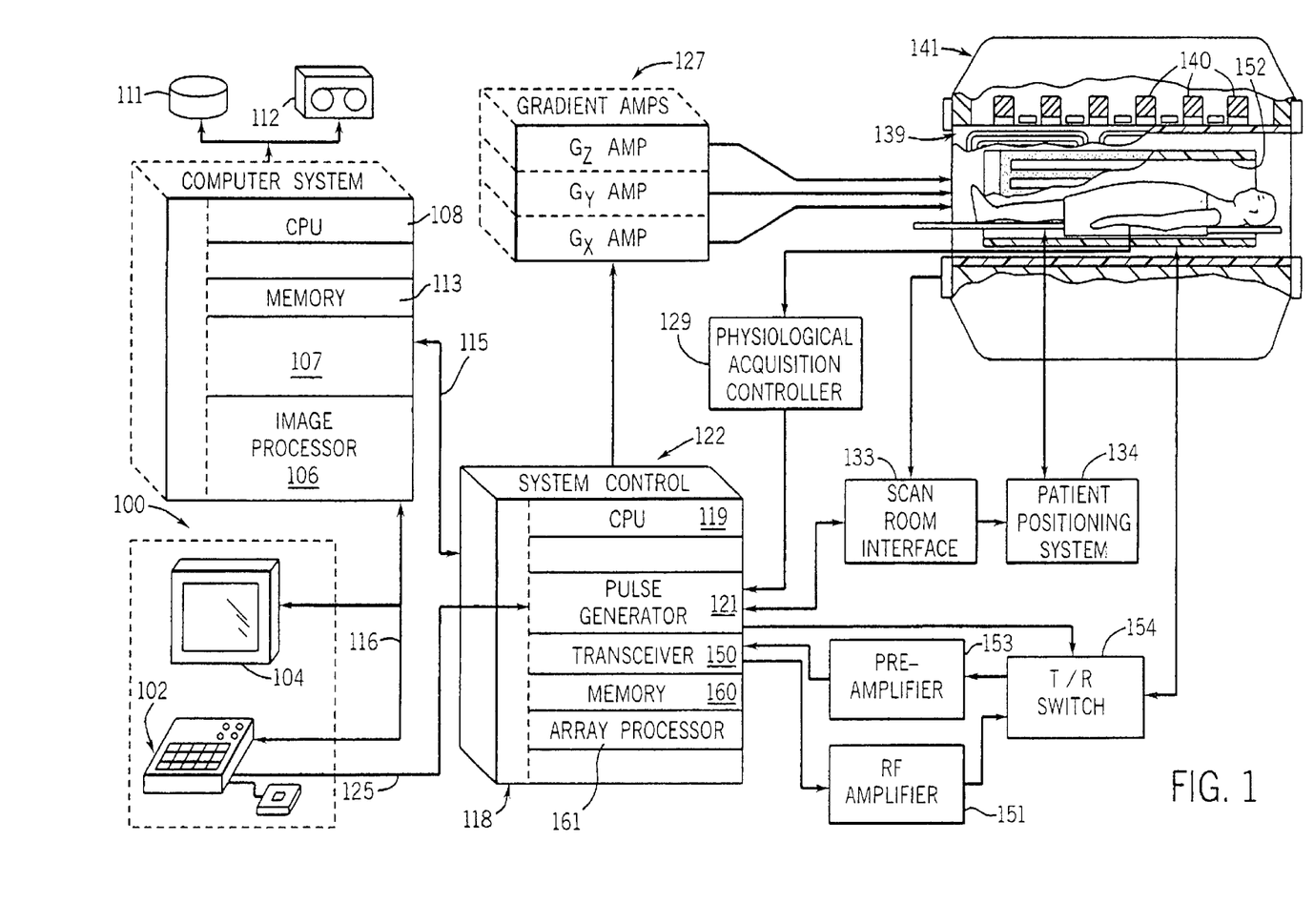
FIG. 1 is a block diagram of an MRI system which employs the preferred embodiment of the present invention.

Referring initially to FIG. 1, there is shown the major components of a preferred magnetic resonance imaging (MRI) system which incorporates the present invention. The operation of the system is controlled from an operator console 100 which includes a keyboard and control panel 102 and a display 104. The console 100 communicates through a link 116 with a separate computer system 107 that enables an operator to control the production and display of images on the screen 104. The computer system 107 includes a number of modules which communicate with each other through a backplane 118. These include an image processor module 106, a CPU module 108 and a memory module 113, known in the art as a frame buffer for storing image data arrays. The computer system 107 is linked to a disk storage 111 and a tape drive 112 for storage of image data and programs, and it communicates with a separate system control 122 through a high speed serial link 115.

The system control 122 includes a set of modules connected together by a backplane. These include a CPU module 119 and a pulse generator module 121 which connects to the operator console 100 through a serial link 125. It is through this link 125 that the system control 122 receives commands from the operator which indicate the scan sequence that is to be performed. The pulse generator module 121 operates the system components to carry out the desired scan sequence. It produces data which indicates the timing, strength and shape of the RF pulses which are to be produced, and the timing of and length of the data acquisition window. The pulse generator module 121 connects to a set of gradient amplifiers 127, to indicate the timing and shape of the gradient pulses to be produced during the scan. The pulse generator module 121 also receives patient data from a physiological acquisition controller 129 that receives signals from a number of different sensors connected to the patient, such as ECG signals from electrodes or respiratory signals from a bellows. And finally, the pulse generator module 121 connects to a scan room interface circuit 133 which receives signals from various sensors associated with the condition of the patient and the magnet system. It is also through the scan room interface circuit 133 that a patient positioning system 134 receives commands to move the patient to the desired position for the scan.

The gradient waveforms produced by the pulse generator module 121 are applied to a gradient amplifier system 127 comprised of $G_x$, $G_y$ and $G_z$ amplifiers. Each gradient amplifier excites a corresponding gradient coil in an assembly generally designated 139 to produce the magnetic field gradients used for position encoding acquired signals. The gradient coil assembly 139 forms part of a magnet assembly 141 which includes a polarizing magnet 140 and a whole-body RF coil 152. A transceiver module 150 in the system control 122 produces pulses which are amplified by an RF amplifier 151 and coupled to the RF coil 152 by a transmit/receive switch 154. The resulting signals radiated by the excited nuclei in the patient may be sensed by the same RF coil 152 and coupled through the transmit/receive switch 154 to a preamplifier 153. The amplified NMR signals are demodulated, filtered, and digitized in the receiver section of the transceiver 150. The transmit/receive switch 154 is controlled by a signal from the pulse generator module 121 to electrically connect the RF amplifier 151 to the coil 152 during the transmit mode and to connect the preamplifier 153 during the receive mode. The transmit/receive switch 154 also enables a separate RF coil (for example, a head coil or surface coil) to be used in either the transmit or receive mode.

The NMR signals picked up by the RF coil 152 are digitized by the transceiver module 150 and transferred to a memory module 160 in the system control 122. When the scan is completed and an entire array of data has been acquired in the memory module 160, an array processor 161 operates to Fourier transform the data into an array of image data. It should be appreciated that while the Fourier transform is used in accordance with the preferred embodiment, other suitable techniques could be used. This image data is conveyed through the serial link 115 to the computer system 107 where it is stored in the disk memory 111. In response to commands received from the operator console 100, this image data may be archived on the tape drive 112, or it may be further processed by the image processor 106 and conveyed to the operator console 100 and presented on the display 104.

For a more detailed description of the transceiver 150, reference is made to U.S. Pat. Nos. 4,952,877 and 4,922,736, which are incorporated herein by reference.

Figure 8:
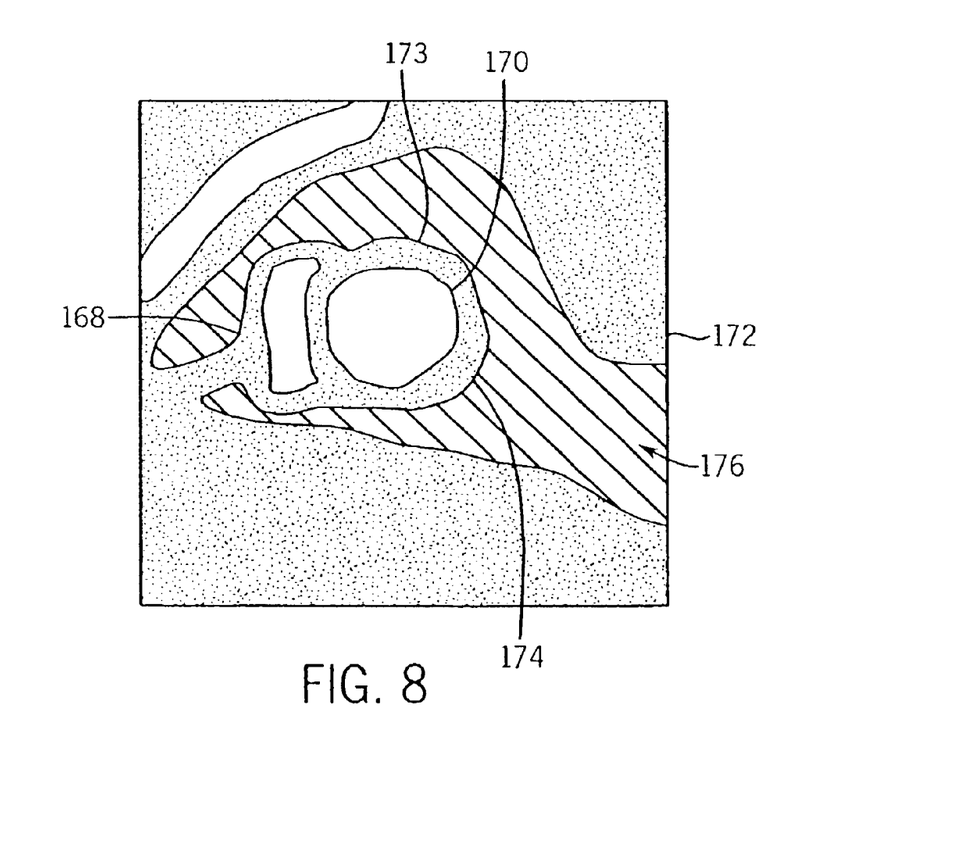
FIG. 8 is a schematic map corresponding generally to a nuclear magnetic resonance image of a chest cavity in accordance with the preferred embodiment.

The MRI system of FIG. 1 performs a series of suitable pulse sequences to collect sufficient NMR data so as to produce an image of the left ventricle, as is well known in the art. FIG. 8 illustrates a schematic representation of a typical chest cavity image identifying a human heart 168 having a left ventricle 170, a blood pool 172, and an epicardium 174. The outer contour of the blood pool 172 defines the endocardial boundary 173. A lung field 176 surrounds or partially surrounds the heart 168.

Figure 2:
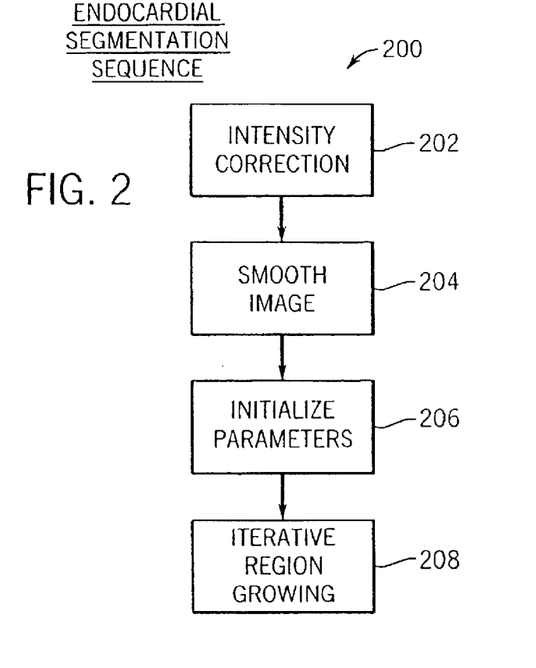
FIG. 2 is a flow chart of the steps performed by the MRI system illustrated in FIG. 1 to carry out an endocardial segmentation process in accordance with the preferred embodiment.

Referring now to FIG. 2, an endocardial segmentation process 200 in accordance with the preferred embodiment endocardial is performed on the acquired image data by the image processor 106. The first step indicated at process block 202 corrects the image for intensity fall off that was produced while acquiring image data. As is well known to those having ordinary skill in the art, the intensity of the resulting image decreases exponentially with increasing distances between the organ being sampled and the imaging coils. Methods of pre-processing acquired images to remove intensity gradients due to intensity fall off are described, for example, in U.S. Pat. No. 5,943,433, entitled "Method for Correcting Inhomogeneity of Spacial Intensity in an Acquired MR Image" and also in pending U.S. patent application Ser. No. 09/317,416, and entitled "Method and Apparatus for Enhancing and Correcting Digital Images" filed May 24, 1999, the disclosures of which are incorporated by reference.

Figure 3:
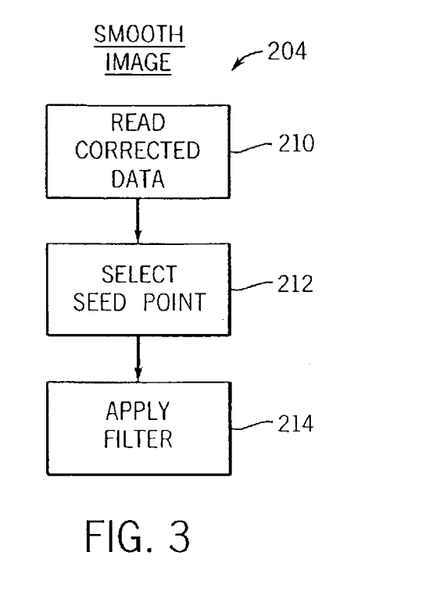
FIG. 3 is a flow chart of the steps performed to carry out the image smoothing step of the endocardial segmentation process illustrated in FIG. 2.

Next process block 204 smoothes the data from the intensity corrected image produced during step 202. In particular, referring to FIG. 3, the corrected cardiac data intensity data for each pixel I(x,y) corresponding to the image as corrected during step 202, is read and stored. The image may comprise the entire acquired image, but should extend beyond the endocardial boundary by a sufficient amount so as to ensure that the entire endocardium is included during subsequent operations, as will be described in more detail below. Next, at process block 212, a point on the image is selected as a seed point. In particular, the seed point is chosen by examining the blood pool and selecting a point on the image that consistently corresponds to the blood pool even while the position of the heart changes during systole and diastole. This assures that the seed point resides within the confines of the endocardial boundary. Additionally, the seed point should additionally not be located too close to the endocardial boundary to permit subsequent operations to take place without error.

Figure 7:
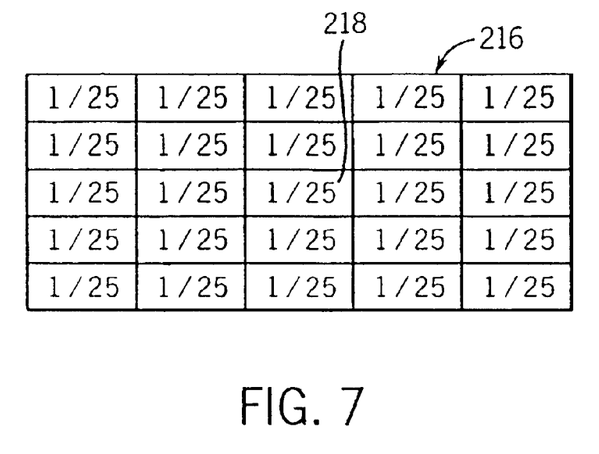
FIG. 7 is an illustration of a box car filter used to carry out the image smooth image step illustrated in FIG. 3.

Next, referring also to FIG. 7, a filter 216 is applied to the input data I(x,y) at process block 214. In particular, filter 216 is a 5×5 box-car filter whose center 218 is placed over the pixel to be averaged. The intensity values of the selected 25 pixels are averaged as the sum of 1/25 of the intensity value at each pixel. The pixel corresponding to the center 218 is updated with that average. The filter 216 is moved across each pixel of the entire image to produce a smoothed image S(x,y). It should be appreciated that while a box-car is implemented in accordance with the preferred embodiment, any method capable of smoothing an acquired MR image may be used. Additionally, as will become apparent from the description below, while the "intensity correction" and "smooth image" processes improve the reliability of the endocardial segmentation process, they are not essential to the operation of the preferred embodiment.

Figure 4:
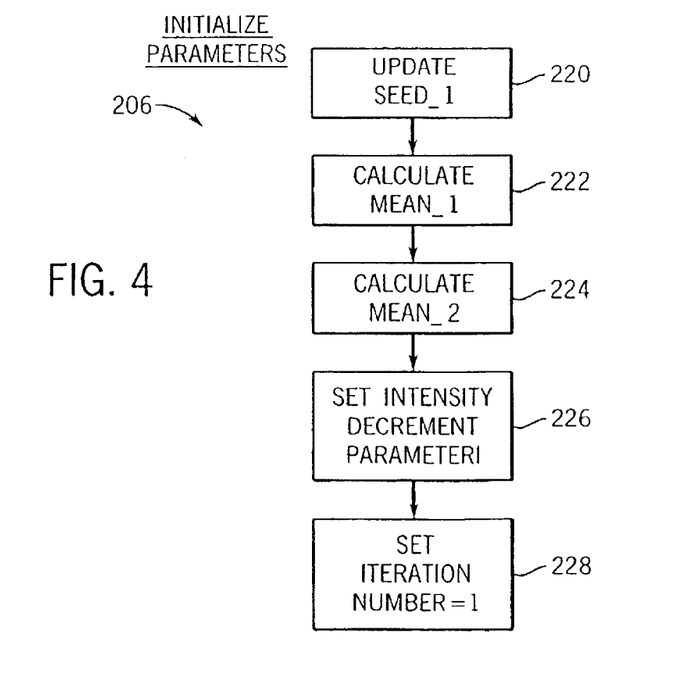
FIG. 4 is a flow chart of the steps performed to carry out the parameter initialization step of the endocardial segmentation process illustrated in FIG. 2.

Once the image has been smoothed at step 204, process 200 proceeds to process block 206 to initialize various parameters that will be used during the subsequent processes of the preferred embodiment. Referring now to FIG. 4, process 206 begins at step 220, whereby a plurality of pixels are chosen that are disposed within a predetermined proximity of the previously selected seed point. A new seed pixel 300 (illustrated in FIG. 9A) is chosen as the pixel of highest intensity within the selected plurality of pixels. The plurality of pixels is selected using an 8×8 array of pixels that surrounds the previously selected seed point in accordance with the preferred embodiment, though it should be appreciated that any suitable alternative array could be used. The new seed pixel 300 will therefore fall within the 8×8 array.

Figure 9A:
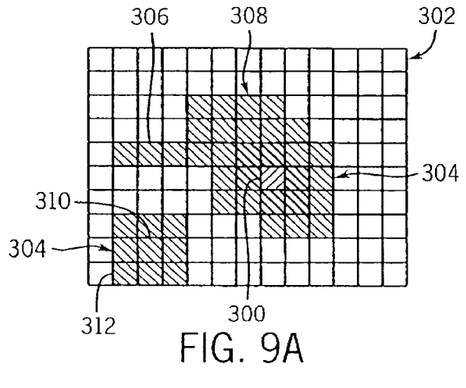
FIG. 9A is a mask representing a plurality of "on" pixels used during the iterative region growing step illustrated in FIG. 5.
Figure 9B:
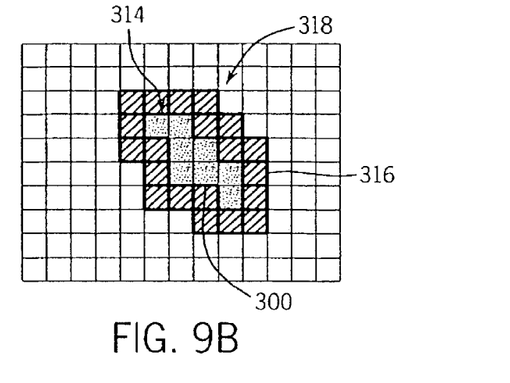
FIG. 9B is the mask of FIG. 9A having unconnected "on" pixels and thin lines removed in accordance with the preferred embodiment.
Figure 9C:
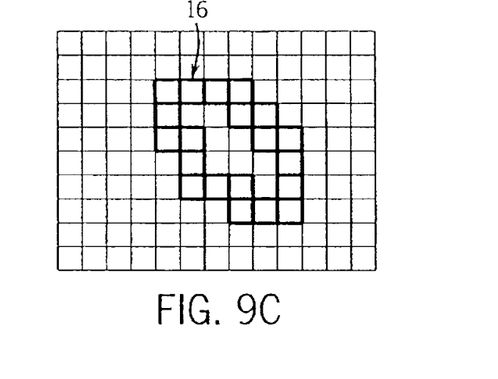
FIG. 9C is the mask of FIG. 9B having the outer ring extracted.

The intensity of the new seed pixel 300 is stored as "Seed_I" and the seed pixel 300 is plotted on binary mask 302. It should be appreciated that FIGS. 9A–C are examples of a portion of a binary map, and does not necessarily correspond to an actual MR image. Rather, the mask 302 is being used to illustrate the various operations that are performed in accordance with the preferred embodiment.

Next, at step 222, a first mean intensity value (MEAN_1) is calculated as the average intensity of those pixels falling within a first neighborhood surrounding the seed pixel. The first mean intensity value is also stored permanently in Initial_Mean_1. In accordance with the preferred embodiment, the first neighborhood is chosen as a 6×6 array of pixels surrounding the seed pixel. Process 206 then proceeds to step 224 and calculates a second mean intensity value (MEAN_2) as the average intensity of those pixels falling within a second neighborhood that is chosen to be significantly larger than the first neighborhood. In accordance with the preferred embodiment, the second neighborhood is selected as a 60×60 array of pixels surrounding the seed pixel. It is appreciated that the second neighborhood may include areas surrounding the endocardium. This is not a concern, however, as the neighborhood is sufficiently large so as to withstand intensity variations that occur at the endocardial boundary and beyond.

At step 226, an intensity decrement factor (DI) is selected which, in part, determines the rate at which the boundary of the mask will advance during subsequent dilation operations. It has been empirically determined that DI=0.07 is sufficient, however, it should be appreciated that suitable alternative values could be chosen, whereby smaller DI values will result in smaller boundary advancements during the dilation iterations to follow. Finally, at step 228, the Iteration_Number is set to a value of 1 in anticipation of the first "Iterative Region Growing" step 208, which is the final step in the Endocardial Segmentation Process 200.

Figure 5:
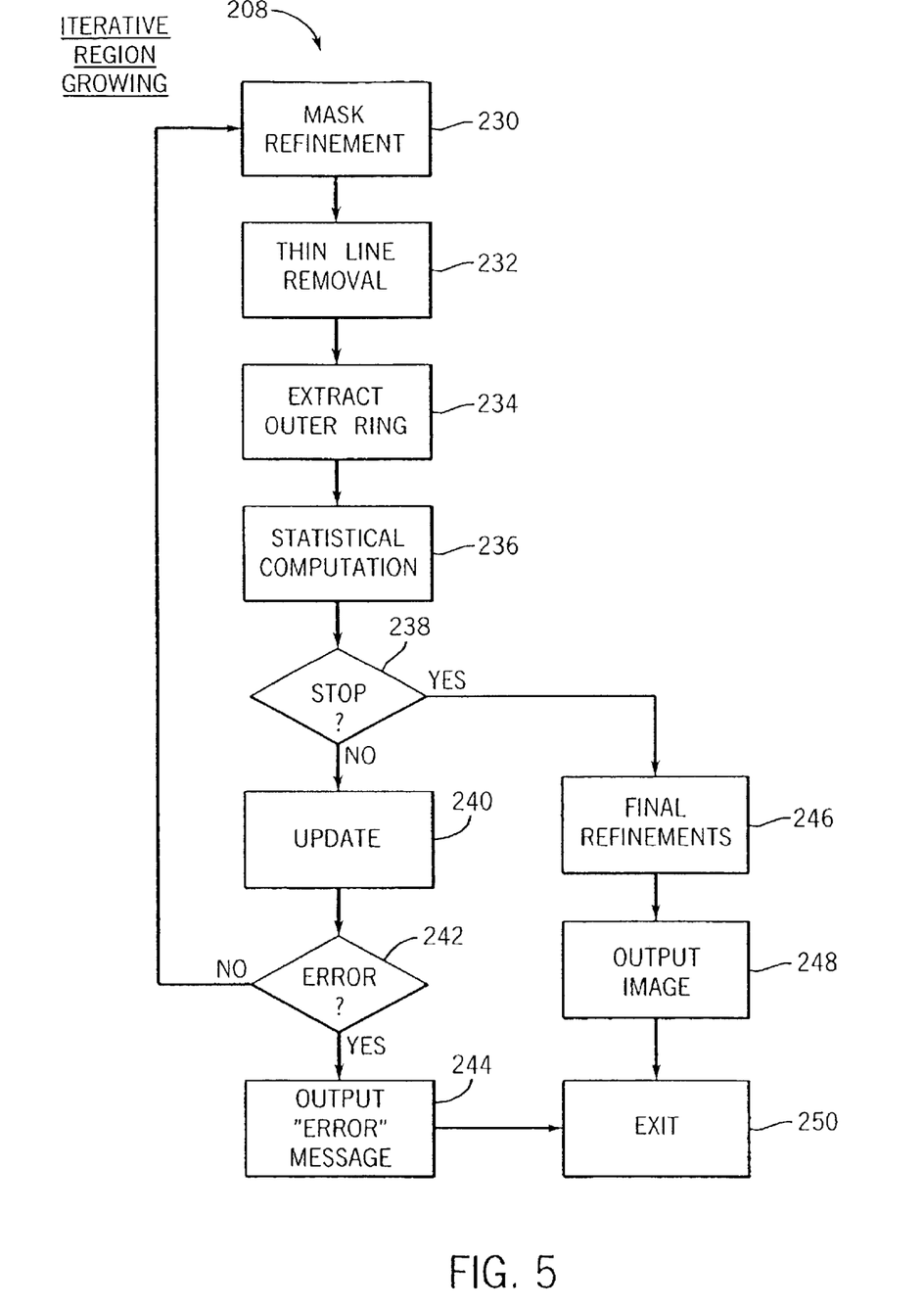
FIG. 5 is a flow chart of the steps performed to carry out the iterative region growing step of the endocardial segmentation process illustrated in FIG. 2.
Figure 6:
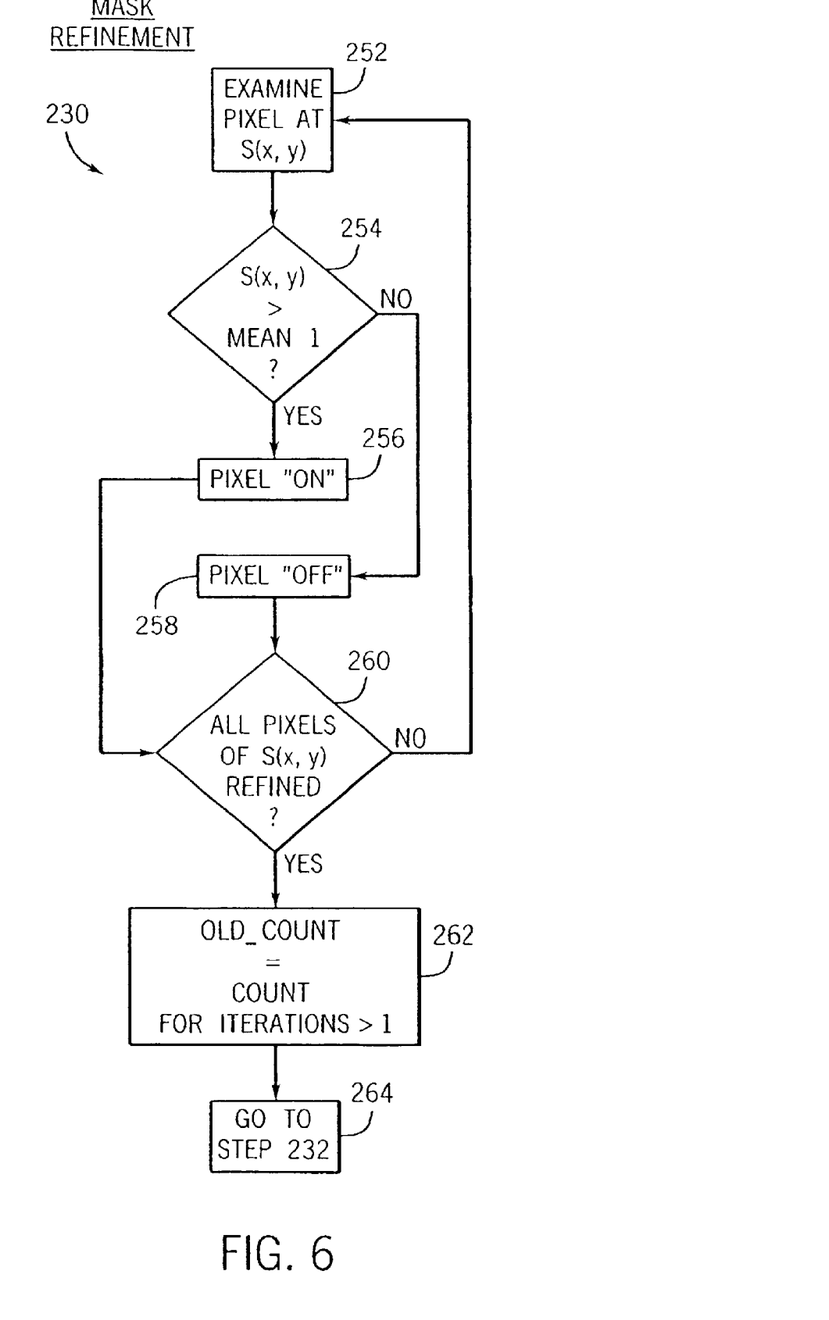
FIG. 6 is a flow chart of the steps performed to carry out the mask refining step of the iterative region growing process illustrated in FIG. 5.

Referring now to FIG. 5, the "Iterative Region Growing" process 208 begins at step 230, where the mask is refined to produce a first contour that will be propagated outwardly in search of the endocardial boundary. The refinement process 230 is illustrated in FIG. 6, and begins at step 252, where a given pixel in the smooth mask is selected for examination. At decision block 254, the pixel intensity of the selected pixel is compared to the intensity value of Mean_1. If the pixel intensity is greater than that of Mean_1, that pixel is turned on at step 256. Otherwise, the pixel is turned off at step 258. The process then proceeds to decision block 260 and determines if all pixels on the mask have been examined. If not, the process reverts to step 252 and continues until all pixels have been examined. Accordingly, any pixel on the mask having a value greater than the small neighborhood average intensity value will be turned on. These pixels may or may not be connected to the seed pixel and, in this regard, they may or may not be disposed within the endocardial boundary. FIG. 9A illustrates those pixels 304 whose intensities are greater than Mean_1.

Once the entire mask has been refined, step 262 sets a parameter "Old_Count" equal to "Count" for all iterations greater than 1. As will become more apparent from the description below, "Count" is a measure of the size of the propagating outer boundary, and will trigger an error message if the boundary becomes too large. "Old_Count" will operate as the boundary size for the previous iteration when "Count" is subsequently updated. Next, step 264 reverts the process 230 to step 232 of the "Iterative Region Growing" process 208.

Figure 10:
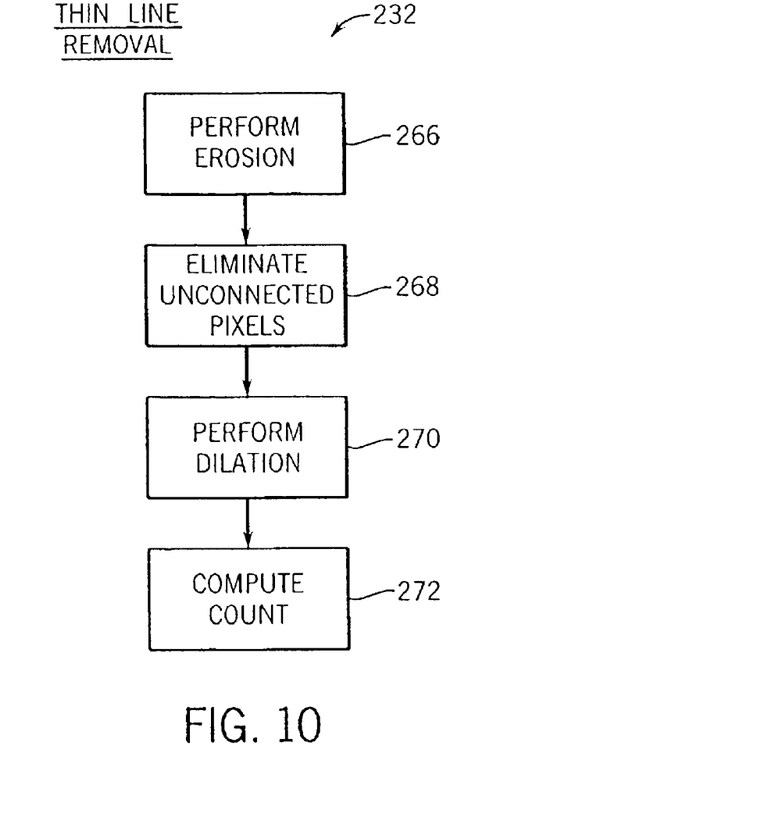
FIG. 10 a flow chart of the steps performed to carry out the thin line removal step of the iterative region growing process illustrated in FIG. 5.

At step 232, a "Thin Line Removal" step is performed on the refined mask 302, as illustrated in more detail in FIG. 10.

Process 232 begins at step 266, where an erosion operation is performed on the refined mask 302. Specifically, the erosion step 266 turns all pixels off that are adjacent an "off" pixel. This will remove the thin line 306 extending from the structure of "on" pixels 308, and will additionally remove the outer layer of the structure 308. Next, at step 268, any "on" pixels that are not connected to the seed pixel, either directly or via other "on" pixels, are removed. For example, in FIG. 9A, this removal step would include the innermost pixel 310, as ring 312 would have been removed in the previous erosion step 266. Accordingly, step 268 will ensure that the resulting propagating boundary will be disposed within the endocardium. Steps 266 and 268 thereby produce an inner core of "on" pixels 314 as illustrated in FIG. 9B.

Next, at step 270, a dilation operation is performed that will turn on those pixels adjacent an "on" pixel. Therefore, a dilated image 318 is produced having an outer ring 316 that surrounds an inner core 314. Accordingly, as may be observed by comparing FIGS. 9A and 9B, the thin line 206 and unconnected group of "on" pixels 310 and 312 have been removed from the mask, thereby allowing for subsequent iterations within the endocardium. Next, at step 272, those pixels comprising the inner core 314 and outer ring 316 are counted and stored as "Count". For example, a value of 28 would be stored into "Count" for the image illustrated in FIG. 9B.

Referring again to FIG. 5, at step 234, process 208 extracts the outer ring 316 from the image 318. This is achieved by performing the above-described erosion operation on the image 318 to remove the outer ring 316. Next, the remaining inner core 314 is subtracted from the image 318 to produce the outer ring 316 illustrated in FIG. 9C. It will be appreciated from the description that follows that the outer ring 316 comprises a boundary that will advance outwardly and across the endocardium in accordance with the preferred embodiment.

Next, at step 236, a statistical computation is performed on the outer ring 316. Specifically, Mean_3 is calculated for the present iteration, which is the mean intensity for all those "on" pixels making up the outer ring 316. The standard deviation SD is also calculated for the ring 316 at step 236.

Next, at step 238, the process 208 determines whether a "Stop" condition exists at decision block 238. The two possible stop conditions are illustrated with reference to FIG. 11. In particular, a first and/or a second condition must be present with a third condition in order to stop the endocardial segmentation process 200. The first condition is met when the Count value has exceeded an empirically derived predetermined maximum number, thereby signifying that the size of the image has increased to the point that it should have crossed the endocardial boundary. It has been determined that a maximum Count of 3000 may be used for this purpose. The second condition is met when the standard deviation (SD) has exceeded an empirically derived predetermined value. This condition will indicate variance in the intensity of the outer ring 316 consistent with the outer ring traversing the endocardial boundary. A predetermined value of 8.0 has been found to work In accordance with the preferred embodiment, though it should be appreciated to one having ordinary skill in the art that alternative suitable values could suffice.

Figure 11:
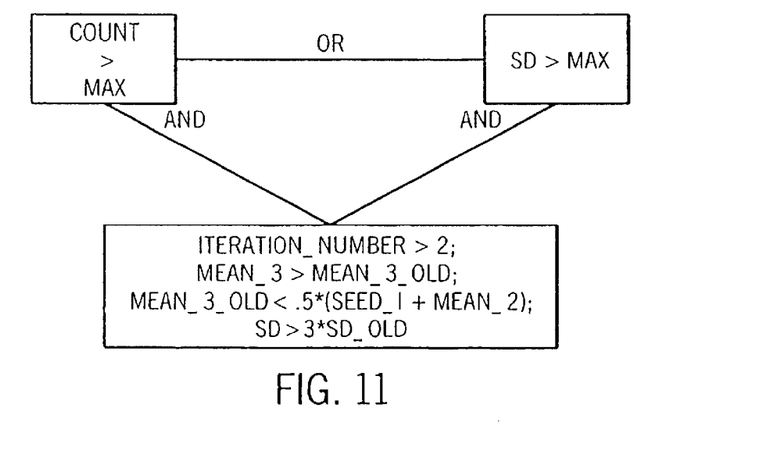
FIG. 11 is a schematic illustration of stopping criteria used during the iterative region growing process illustrated in FIG. 5.

The third condition that must be present along with at least one of the first and second conditions to trigger the stop condition at decision block 238 is fourfold. First, the iteration number must be greater than 2. Next, the mean intensity of the outer ring 316 (Mean_3) must be greater than the mean intensity of the outer ring 316 of the previous iteration (Mean_3_Old). Next, the mean intensity of the outer ring 316 of the previous iteration must be less than one-half the sum of the intensity of the seed pixel and the large neighborhood intensity (Mean_2) calculated during step 224. Finally, the standard deviation for the outer ring 316 (SD) must be greater than the standard deviation for the outer ring 316 calculated during the previous iteration (SD_Old). If it is determined at decision block 238 that a "stop" condition exists, process 208 proceeds to step 246, wherein final refinements are made to the mask, as will be described in further detail below.

If, however, it is determined that the "stop" condition is not met, either due to the absence of both the first and second conditions, or the absence of the third condition, process 208 updates various parameters at step 240 in anticipation of the next iteration. First, MEAN_1 is updated to equal Initial_Mean_1*(1−DI*Iteration_Number). In the next iteration, as described above, the threshold criteria depend on the value of Mean_1 such that lower DI values produce more inclusive mask refinements at step 230, thereby propagating the outer ring 316 outwardly at a greater rate. Next, Mean_3_Old and SD_Old are updated as the current mean and standard deviation for the outer ring 316, respectively, that will be used during the next iteration. Additionally, Iteration_Number is incremented by 1.

Next a determination is made whether the endocardial segmentation process 200 has failed at decision block 242. In particular, one of two conditions will trigger an error. The first error condition occurs when Old_Count is greater than the maximum size. This error condition indicates that the outer ring 316 had exceeded the maximum size during the previous iteration, and the present iteration, but that the statistics did not indicate that the outer ring 316 traversed the endocardial boundary, as determined using the third condition in FIG. 11. The second error condition occurs when Iteration_Number has exceeded an empirically derived predetermined maximum acceptable value. In accordance with the preferred embodiment, the maximum number of iterations has been chosen to equal 40, though one having ordinary skill in the art appreciates that this number may differ. If either of these error conditions are present at decision block 242, process 208 will display an error message to the user at step 244. Information regarding the cause of the error message my additionally be output if so desired. Finally, the endocardial segmentation process 200 will terminate at step 250.

Otherwise, if no error is present at decision block 242, process 208 reverts to step 230 to perform an additional iteration. Subsequent iterations are performed until a satisfactory result is achieved, or an error is produced.

As discussed above, if the process 208 determines at decision block 238 that a stop condition exists, thereby signifying that the outer ring 316 has traversed the endocardial boundary, final refinements are made to the image at step 246. Specifically, referring to FIG. 12, the refinement process 246 begins at decision block 274, and updates Mean_1 in anticipation of a final thresholding operation. If Mean_3_Old>0, Mean_1 is updated to the mean intensity value of the outer ring 316 at the previous iteration (Mean_3_Old) at step 278. (Mean_3_old could be less than 0, for example, if for example, the outer ring is disposed in an area of backflow in the blood pool.) Otherwise, at step 278, Mean_1 is updated to the mean intensity value of the large neighborhood boundary (Mean_2), as determined during the parameter initialization process 208. If, however, it is determined at decision block 280 that Mean_3_Old>than Mean_3, then Mean_1 is updated to Mean_3.

Figure 12:
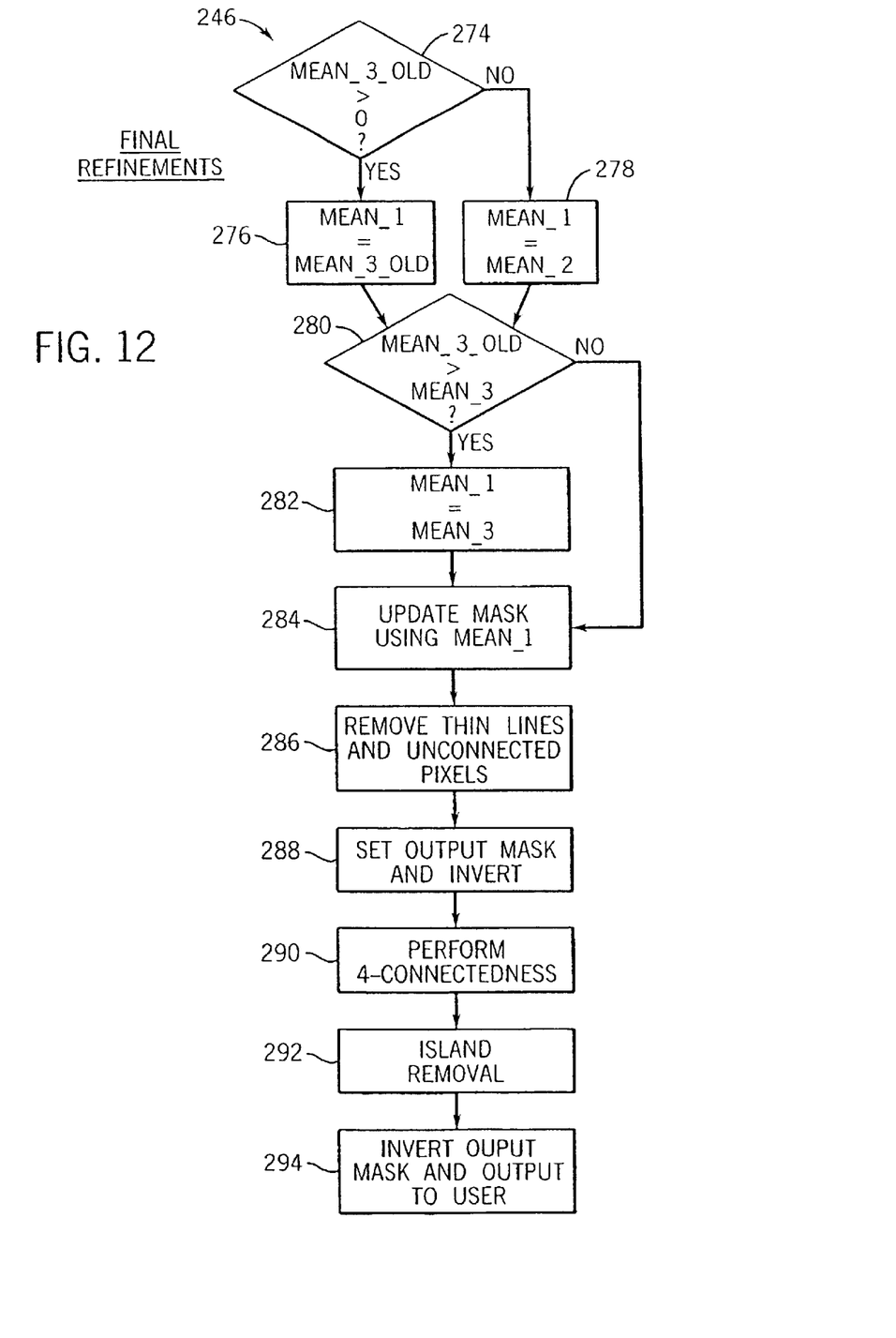
FIG. 12 is a flow chart of the steps performed to carry out the final refinements step of the iterative region growing process illustrated in FIG. 5.

Next, at step 284, the mask is updated to turn all pixels on whose intensities are greater than Mean_1. All other pixels are turned off. The update step 284 essentially retracts the expansion boundary, which has already crossed the endocardial boundary, as indicated by the statistics at decision block 238. At step 286, all thin lines and pixels that are unconnected to the seed pixel are removed, as discussed above with reference to steps 266–270.

At step 288, the mask is copied and written to an output mask, which will produce the endocardial contour for the user. First, the output mask is inverted, such that all "on" pixels and turned off, and vice versa. Next, at step 290, a 4-connectedness operation is performed turn off those pixels that do not have neighboring "on" pixels to the north, south, east and west. At step 292, the remaining groups of pixels are examined to determine whether those groups are of a sufficient size. Accordingly, those groups of "on" pixels that are unconnected to the seed pixel, and that are less than a predetermined size, for example 150 pixels (islands) are turned off. The output mask is once again inverted so as to once again turn on those pixels that were on before the previous inversion. Additionally, the second inversion turns on those small clusters that did not meet the final thresholding criteria, and that were therefore off before the previous inversion. This recognizes that relatively small portions of the blood pool that may not have the requisite intensities to meet the final thresholding criteria, but that form part of the blood pool nonetheless, for example backflow within the blood pool, properly assume a portion of the final output image.

The net result of the two inversions, therefore, is to turn on those small groups of pixels disposed within the endocardial boundary. Accordingly, referring to an accurate representation of the blood pool is produced, the outer periphery of which defines the contour of the endocardial boundary. Additionally, the MR image corresponding to the output mask may also be output to the user. If desired, the outer boundary of the image may be smoothed before outputting the output mask to the user. One method of smoothing the boundary of an image is disclosed in a U.S. patent application, filed on even date herewith, and entitled Method and Apparatus for Fitting a Smooth Boundary to Segmentation Masks, the disclosure of which is hereby incorporated by reference.

EXAMPLE OF THE PREFERRED EMBODIMENT

Figure 13:
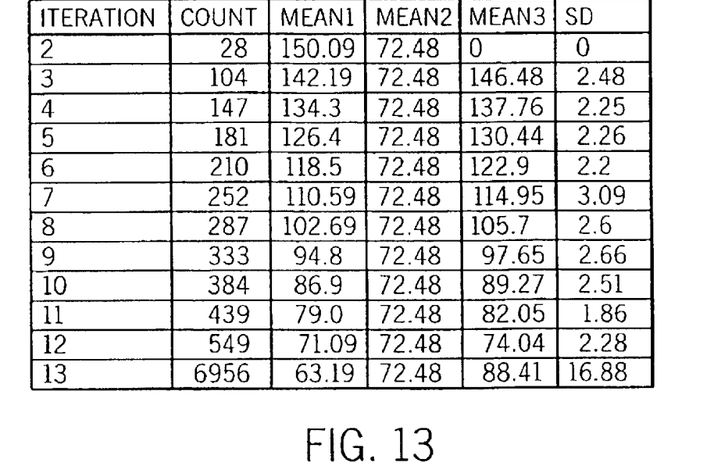
FIG. 13 is an illustration of statistical data acquired during the endocardial segmentation process in accordance with the preferred embodiment.
Figure 14:
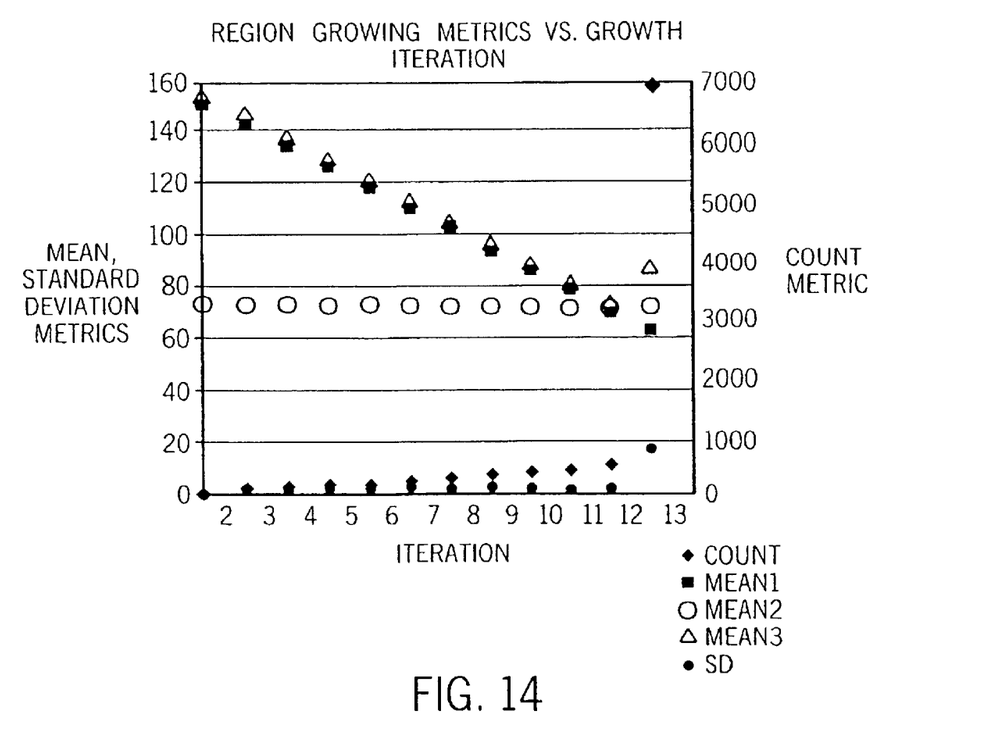
FIG. 14 is a graphical representation of the data acquired in FIG. 13.
Figure 15:
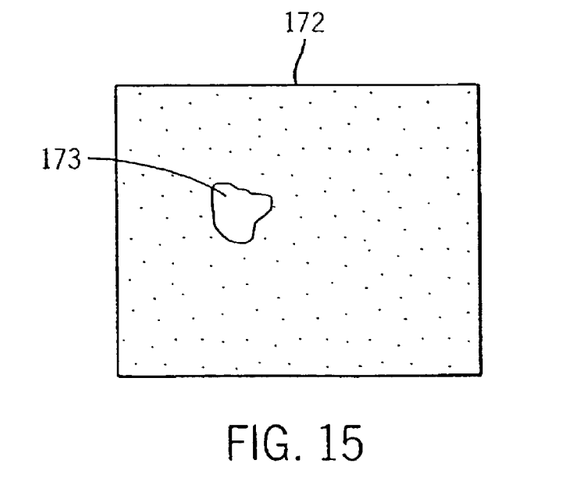
FIG. 15 is an illustration of the output mask produced during the final refinements step illustrated in FIG. 12 reflecting the data acquired in FIG. 13.

Referring now to FIGS. 13 and 14, data acquired while carrying out the endocardial segmentation process is illustrated for iterations 2–13. It is evident that, at iteration 13, the average intensity for the ring increased, as did the standard deviation. This indicates that the expansion boundary has traversed the endocardium and entered surrounding tissue, such as the myocardium, epicardium, and surrounding tissue. Accordingly, at iteration 13, because Mean_3_Old is greater than 0, and less than Mean_3, Mean 1 is updated to 74.04 during the final refinement process 246. The mask is updated, and an output mask illustrated in FIG. 15 is provided demonstrating the blood pool 172, whose outer contour defines the endocardial boundary 173.

The invention has been described in connection with what are presently considered to be the most practical and preferred embodiments. However, the present invention has been presented by way of illustration and is not intended to be limited to the disclosed embodiments. Accordingly, those skilled in the art will realize that the invention is intended to encompass all modifications and alternative arrangements included within the spirit and scope of the invention, as set forth by the appended claims.

What is claimed is:

1. A method for segmenting an image acquired with a medical imaging system to identify the boundary of an organ, comprising:
   A. acquiring image data of said organ with said medical imaging system;
   B. reconstructing an image corresponding generally to said organ;
   C. selecting a starting location on said reconstructed image within the confines of said boundary of said organ;
   D. iteratively propagating an expansion boundary around said starting location outwardly a plurality of times until it is determined that said expansion boundary has traversed said boundary of said organ;
   E. refining said reconstructed image, including:
      i. activating pixels on said reconstructed image having an intensity value greater than an intensity of said expansion boundary during a previous iteration;
      ii. removing pixels not connected to said starting location;
      iii. mapping said reconstructed image onto an output image; and
      iv. activating pixel clusters within said expansion boundary that are smaller than a predetermined threshold; and
   F. outputting a representation of said boundary of said organ.

2. The method as recited in claim 1, wherein step (C) further comprises selecting a point on said reconstructed image corresponding to said image data and having a relatively high intensity.

3. The method as recited in claim 1, wherein step (D) further comprises acquiring statistical data corresponding to said expansion boundary after each iteration.

4. The method as recited in claim 3, further comprising determining that said expansion boundary has traversed said boundary of said organ based on said statistical data, wherein said statistical data includes a standard deviation of intensity values of said image data corresponding to said expansion boundary.

5. The method as recited in claim 3, further comprising determining that said expansion boundary has traversed said boundary of said organ based on statistical data including the size of said expansion boundary, and a standard deviation of intensity values corresponding to said expansion boundary.

6. The method as recited in claim 1, wherein step (D) further comprises, subsequent to each iteration:
   a. refining said reconstructed image to remove any fine lines and clusters of pixels not connected to said starting location;
   b. producing said expansion boundary as an outer boundary of said reconstructed image; and
   c. calculating statistics pertaining to said expansion boundary; and;
   d. based on said statistics, determining when said expansion boundary has traversed said boundary of said organ.

7. The method as recited in claim 1, wherein step (E) further comprises activating all pixels having intensity values greater than the intensity of said expansion boundary during the previous iteration.

8. The method as recited in claim 1, wherein step (E) further comprises removing fine lines and clusters of pixels not connected to said starting location.

9. The method as recited in claim 1, further comprising:
G. determining that an error condition exists when at least one of the following conditions are met;
1. the size of said expansion boundary has exceeded a maximum threshold and said expansion boundary has not been determined to have traversed said boundary of said organ; and
2. a maximum number of iterations have been performed and said expansion boundary has not been determined to have traversed said boundary of said organ.

10. The method as recited in claim 1, wherein said boundary of said organ is a left ventricular endocardium of a human heart.

11. A magnetic resonance imaging system for producing an image of an outer boundary of an organ, comprising:
means for acquiring NMR image data of said organ;
means for reconstructing an image corresponding generally to said organ;
means for selecting a starting location on said reconstructed image within the confines of said boundary of said organ;
means for iteratively propagating an expansion boundary around said starting location outwardly a plurality of times until it is determined that said expansion boundary has traversed said boundary of said organ;
means for refining said reconstructed image, including:
i. means for activating pixels on said reconstructed image having an intensity value greater than an intensity of said expansion boundary during a previous iteration;
ii. means for removing pixels not connected to said starting location;
iii. means for mapping said reconstructed image onto an output image; and
iv. means for activating pixel clusters within said expansion boundary that are smaller than a predetermined threshold; and
means for outputting a representation of said boundary of said organ.

12. The magnetic resonance imaging system as recited in claim 11, wherein said means for selecting further comprises means for selecting a point on said reconstructed image corresponding to said image data and having a relatively high intensity.

13. The magnetic resonance imaging system as recited in claim 11, further comprising means for acquiring statistical data corresponding to said expansion boundary after each iteration.

14. The magnetic resonance imaging system as recited in claim 13, wherein said means for acquiring statistical data further comprises means for determining that said expansion boundary has traversed said boundary of said organ based on said statistical data, wherein said statistical data includes a standard deviation of intensity values of said image data corresponding to said expansion boundary.

15. The magnetic resonance imaging system as recited in claim 13, wherein said means for acquiring statistical data further comprises means for determining that said expansion boundary has traversed said boundary of said organ based on statistical data including the size of said expansion boundary, and a standard deviation of intensity values corresponding to said expansion boundary.

16. The magnetic resonance imaging system as recited in claim 11, further comprising means for determining that an error condition exists when one of the following conditions are met;
1. the size of said expansion boundary has exceeded a maximum threshold and said expansion boundary has not been determined to have traversed said boundary of said organ; and
2. a maximum number of iterations have been performed and said expansion boundary has not been determined to have traversed said boundary of said organ.

17. The magnetic resonance imaging system as recited in claim 11, wherein said outer boundary of said organ comprises a left ventricular endocardium of a human heart.

18. The magnetic resonance imaging system as recited in claim 11, wherein said means for refining further comprises means for activating all pixels having intensity values greater than the intensity of said expansion boundary during the previous iteration.

19. The magnetic resonance imaging system as recited in claim 11, wherein said means for refining further comprises means for removing fine lines and clusters of pixels not connected to said starting location.

* * * * *